S. N. KOHN.
BUTTER SPREADER.
APPLICATION FILED SEPT. 1, 1921.

1,426,085.  Patented Aug. 15, 1922.

Inventor
SIMON N. KOHN.
By his Attorneys
Bartlett+Brownell

UNITED STATES PATENT OFFICE.

SIMON N. KOHN, OF CLEVELAND, OHIO.

BUTTER SPREADER.

1,426,085.  Specification of Letters Patent.  Patented Aug. 15, 1922.

Application filed September 1, 1921. Serial No. 497,501.

*To all whom it may concern:*

Be it known that I, SIMON N. KOHN, a citizen of the United States, residing at Cleveland, county of Cuyahoga, State of Ohio, have invented certain new and useful Improvements in Butter Spreaders, of which the following is a full, clear, and exact description.

The present invention relates particularly to butter spreaders for table use, and has for its object to provide a novel and improved article of this character with which cold, hard butter may be evenly spread much more easily than is possible with spreaders at present in common use.

The features of the invention, whereby this object is attained, will be clearly understood from the following description and accompanying drawings, in which.

Figure 1:
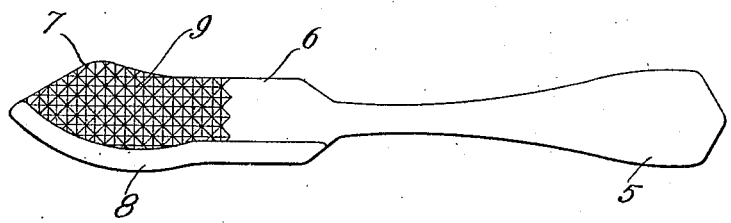
Figure 1 is a side elevation of the butter spreader in its preferred form.
Figure 2:
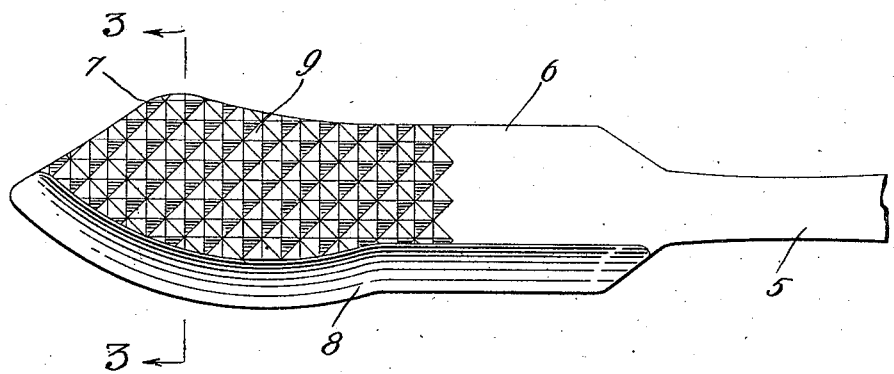
Fig. 2 is a side elevation, on a large scale, of the blade portion of the spreader.
Figure 3:
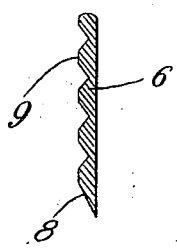
Fig. 3 is a transverse sectional view taken on the line 3—3 of Fig. 2.

The butter spreader as shown is provided with the usual handle 5 and blade 6 having an enlarged butter spreading end 7.

When butter is cold and hard considerable difficulty is frequently experienced in spreading it with the use of the usual spreader having a smooth sided blade, as the blade easily slips over the butter and is apt to make it more or less lumpy instead of spreading it smoothly and evenly. To overcome this difficulty the present construction has a longitudinal edge portion 8 of one side beveled to form a knife edge and has the portion 9 adjacent this beveled portion provided with relatively coarse striations extending diagonally across the blade in one direction and similar striations extending diagonally across the blade in a transverse direction to form a knurled surface. The smooth beveled portion 8 extends to the outer extremities of the serrations so that the serrations do not interfere with the cutting of the butter. It will be apparent that in spreading a piece of butter all lumps may be quickly evened by means of the serrated surface and the butter spread economically in a smooth and even layer.

While it is preferred to employ the specific construction illustrated and described, it is to be understood that this construction is not essential except so far as specified in the claims.

What I claim is:

1. A butter spreader provided with a blade having one side flat and a longitudinal edge portion of its other side beveled to form a knife edge, with the portion of the latter side adjacent said beveled portion knurled to form a roughened surface.

2. A butter spreader provided with a blade having a knife edge with a portion of one side of the blade spaced from said knife edge knurled to form a roughened surface, the other side of said blade being flat.

SIMON N. KOHN.